United States Patent [19]

Deng et al.

[11] Patent Number: 5,545,439
[45] Date of Patent: Aug. 13, 1996

[54] METHOD FOR COATING A METAL COOKWARE

[76] Inventors: Chih-Chiang Deng, No. 86, Lane 267, Sec. 3, Chien-Kuo Rd., Feng-Shan City, Kaohsiung Hsien; Tung-Hung Tsai, No. 20, Lane 104, Ta-Liao Rd., Ta-Liao Hsiang, Kaohsiung Hsien, both of Taiwan

[21] Appl. No.: 349,079

[22] Filed: Dec. 2, 1994

[51] Int. Cl.⁶ ........................................................ B05D 3/00
[52] U.S. Cl. .......................... 427/327; 427/385.5; 205/85; 205/122; 205/208
[58] Field of Search ............................... 427/327, 385.5; 205/85, 122, 208

[56] References Cited

U.S. PATENT DOCUMENTS

| | | | |
|---|---|---|---|
| 3,936,569 | 2/1976 | Miller et al. | 428/339 |
| 4,167,605 | 9/1979 | Attwood et al. | 428/419 |
| 4,262,043 | 4/1981 | Wald | 427/387 |
| 5,411,771 | 5/1995 | Tsai | 427/456 |
| 5,462,769 | 10/1995 | Tsai | 427/307 |

*Primary Examiner*—Benjamin Utech
*Attorney, Agent, or Firm*—Ladas & Parry

[57] ABSTRACT

A method for coating a metal cookware includes the steps of (A) cleaning the metal cookware; (B) forming a scratch-resistant oxide film on the cooking surface by anodic oxidation; (C) roughening the scratch-resistant oxide film by blasting to form a roughened surface thereon, the roughened surface having valleys extending into the cooking surface; and (D) applying an anti-stick film of fluorocarbon resin on the roughened surface.

7 Claims, 3 Drawing Sheets

METHOD FOR COATING A METAL COOKWARE

BACKGROUND OF THE INVENTION

1. Field of the Invention

This invention relates to a method for coating a metal cookware, more particularly to a method for coating a metal cookware having scratch-resistant and anti-stick characteristics and a relatively long service life.

2. Description of Related Arts

The common methods used for surface treatment of metal cookware are described as follows:

1. The cooking surface of the metal cookware is roughened by blasting abrasive particles, such as aluminum oxide ($Al_2O_3$) or steel grains, against the cooking surface. A hard oxide film is then formed on the roughened cooking surface by an anodic oxidation. During the anodic oxidation, an electrolytic solution containing sulfuric acid or oxalic acid is employed. Since the hard oxide film is provided on the cooking surface of the metal cookware, the cooking surface has a scratch-resistant characteristic. However, a main drawback of the metal cookware is that the cooking surface does not have an anti-stick characteristic, thereby facilitating the accumulation of greasy dirt thereon.

2. The cooking surface of the metal cookware is roughened by blasting abrasive particles, such as aluminum oxide ($Al_2O_3$) or steel grains, against the cooking surface. An anti-stick film is then formed by spraying suspended fluorocarbon resin upon the roughened cooking surface. Since the fluorocarbon resin film is provided on the cooking surface of the metal cookware, the cooking surface has an anti-stick characteristic. However, the hardness of the cooking surface of the metal cookware is relatively poor such that the cooking surface is susceptible to scratching.

3. After the cooking surface is roughened, a hard oxide film is applied on the roughened cooking surface, and an anti-stick film is then applied upon the hard oxide film. Referring to FIG. 1, abrasive particles, such as $Al_2O_3$ or steel grains, are blasted against the cooking surface of the metal cookware 6 to form a roughened surface 61. Referring to FIG. 2, a porous hard oxide film 7 is coated on the roughened surface 61 by an anodic oxidation with the use of the electrolytic solution containing sulfuric acid or oxalic acid. Referring to FIG. 3, the hard oxide film 7 of the metal cookware 6 is further coated with an anti-stick film 8. Since the metal cookware 6 is provided with both the hard oxide film 7 and the anti-stick film 8, the cooking surface of the metal cookware 6 has the scratch-resistant and anti-stick characteristics. Referring to FIGS. 2 and 3, the formation of the roughened surface 61 can facilitate the attachment and bonding of the hard oxide film 7 to the metal cookware 6. However, since the roughness of the hard oxide film 7 is relatively low, the attachment and bonding between the hard oxide film 7 and the anti-stick film 8 is not strong. Therefore, the anti-stick film 8 easily peels off after a period of use.

SUMMARY OF THE INVENTION

Therefore, the objective of this invention is to provide a method for coating a metal cookware having scratch-resistant and anti-stick characteristics and a relatively long service life.

According to this invention, the method for coating a metal cookware comprises the steps of (A) cleaning the metal cookware; (B) forming a scratch-resistant oxide film on the cooking surface by anodic oxidation; (C) roughening the scratch-resistant oxide film by blasting to form a roughened surface thereon, the roughened surface having valleys extending into the cooking surface; and (D) applying an anti-stick film of fluorocarbon resin on the roughened surface.

The metal cookware may be made of a material selected from the group consisting of aluminum and aluminum alloy. An electrolytic solution used in the step (B) may be a mixture of sulfuric acid, magnesium sulfate and ferrous sulfate. The scratch-resistant oxide film may contain aluminum oxide, magnesium oxide and iron oxide.

The step (A) may comprise immersing the metal cookware in a base solution and then in water in order to remove grease and other contaminants. The base solution is a sodium hydroxide solution in which a ratio of sodium hydroxide to water is about 3 to 1.

The oxide film in the step (B) has a thickness of 40–80 μm. The roughened surface after the step (C) has a roughness (Ra) of 6–8 μm, and the depth of valleys is about 25–60 μm.

BRIEF DESCRIPTION OF THE DRAWINGS

Other features and advantages of the present invention will become apparent in the following detailed description of the preferred embodiment, with reference to the accompanying drawings, in which.

DETAILED DESCRIPTION OF THE PREFERRED EMBODIMENT

Figure 1:
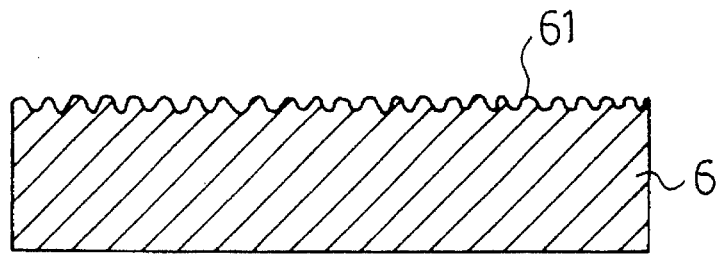
FIG. 1 is a sectional view showing a conventional metal cookware provided with a roughened surface.
Figure 2:
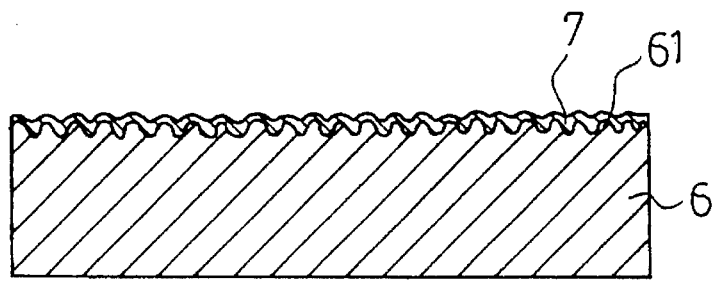
FIG. 2 is a sectional view showing a conventional metal cookware provided with a hard oxide film on the roughened surface.
Figure 3:
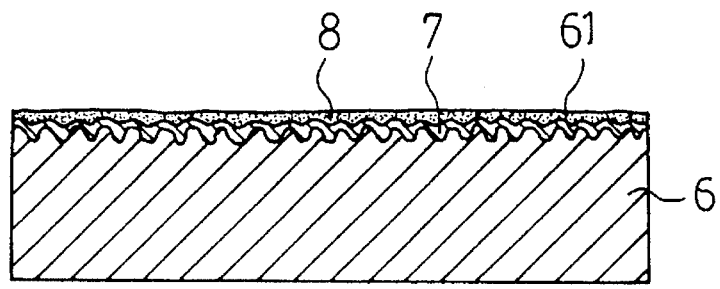
FIG. 3 is a sectional view showing a conventional metal cookware provided with an anti-stick film on the hard oxide film.
Figure 4:
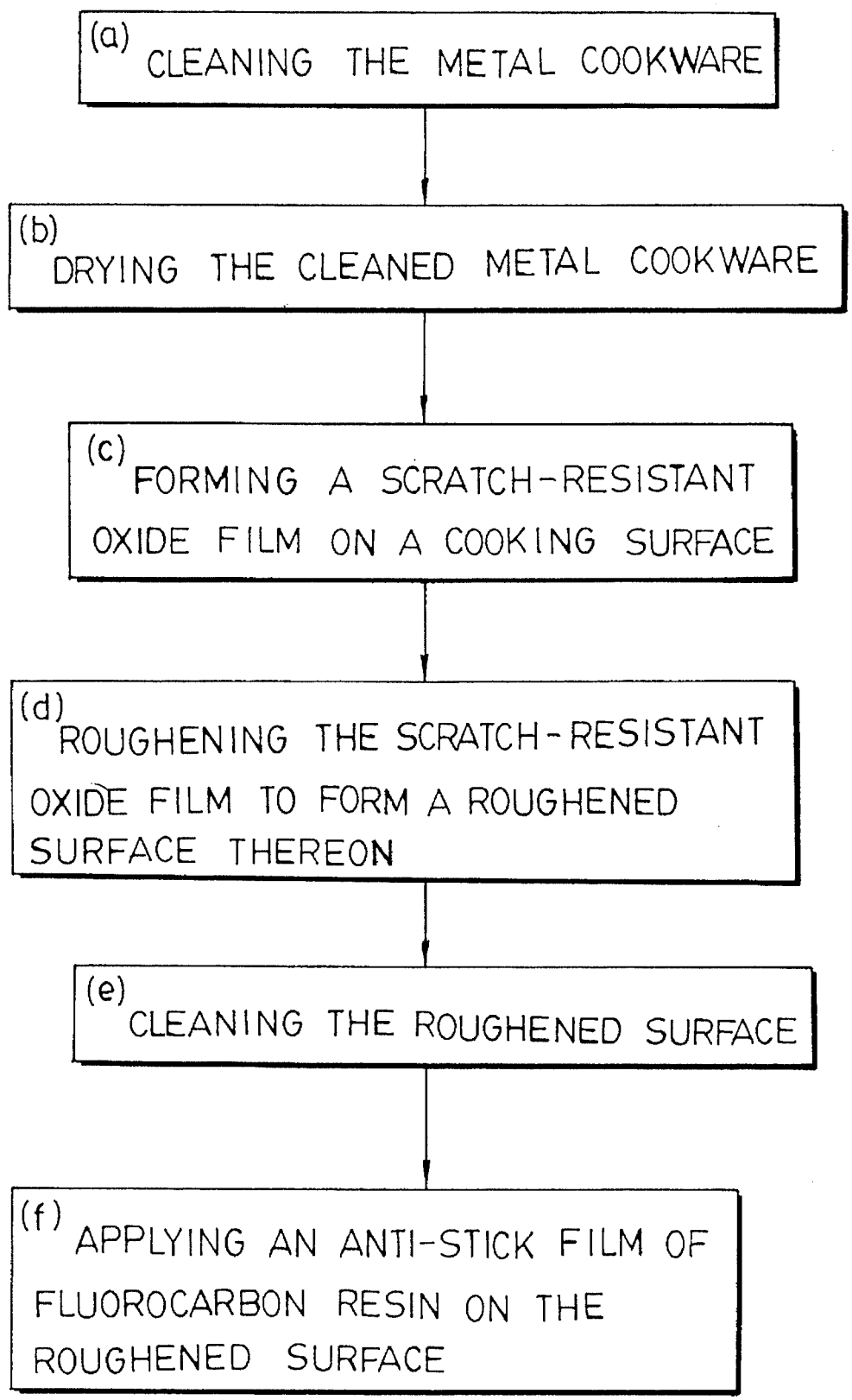
FIG. 4 is a flow diagram of a coating method of this invention.

Referring to FIG. 4, a metal cookware, which is a product of aluminum or aluminum alloy formed by punching, is subjected to the coating method of this invention, the latter comprising the steps of: (a) cleaning the metal cookware by immersing the metal cookware in a base solution and then in water in order to remove grease and other contaminants; (b) drying the cleaned metal cookware; (c) forming a scratch-resistant oxide film on a cooking surface of the metal cookware by anodic oxidation; (d) roughening the scratch-resistant oxide film by blasting to form a roughened surface thereon, the roughened surface having valleys extending into the cooking surface; (e) cleaning the roughened surface by blowing pressurized air thereagainst; and (f) applying an anti-stick film of fluorocarbon resin on the roughened surface. The step (f) can comprise the steps of (f1) applying a primer coating of fluorocarbon resin and heating the primer coating, (f2) applying a top coating of fluorocarbon resin and heating the top coating, and (f3) cooling forcibly the top coating after the step (f2).

Figure 5:
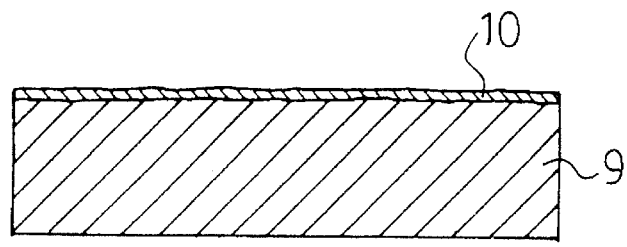
FIG. 5 is a sectional view showing a metal cookware of this invention provided with a hard oxide film on a cooking surface of the metal cookware.
Figure 6:
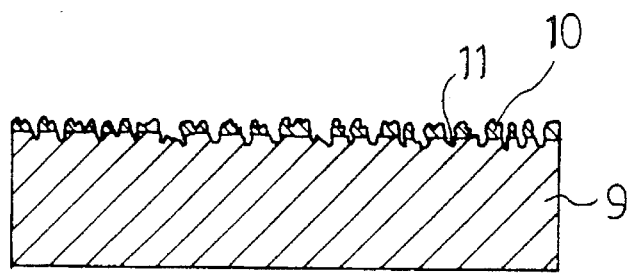
FIG. 6 is a sectional view showing the hard oxide film on the cooking surface of the metal cookware formed with a roughened surface.
Figure 7:
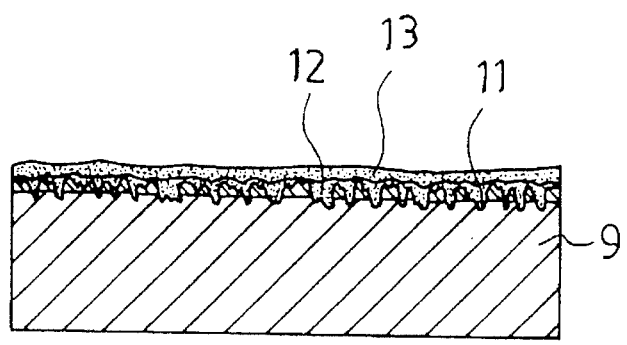
FIG. 7 is a sectional view showing the roughened surface of the metal cookware is coated with an anti-stick film of fluorocarbon resin.

Referring to FIGS. 5 to 7, a metal cookware 9, which is a product of aluminum or aluminum alloy formed by punching, is immersed in a base bath at a temperature of about 50°–70° C. for about 3–5 minutes. The base bath contains a sodium hydroxide solution in which a ratio of sodium hydroxide to water is about 3 to 1. The metal cookware 9 is then immersed in a water bath at a temperature of about 50°–70° C. for about 3–5 minutes so as to remove grease and other contaminants. Afterwards, the cleaned metal cookware 9 is dried in a drying oven at a temperature of about 200° C. for about 3–5 minutes.

The metal cookware 9 undergoes an anodic oxidation process in order to form a hard oxide film on a cooking surface thereof. During the anodic oxidation process, an electrolytic solution containing sulfuric acid, magnesium sulfate and ferrous sulfate and having a concentration of 100–350 g/L is provided. The temperature is controlled at −5°–20° C. The current is 2 A/dm$^2$ and can be a direct current or an alternating current. In addition, the electrolytic voltage is 20–40 V. Referring to FIG. 5, an oxide film 10 is formed on the cooking surface of the metal cookware 9. The oxide film 10 contains aluminum oxide, magnesium oxide and iron oxide, and has a thickness of about 40–80 μm.

Referring to FIG. 6, the oxide film 10 is roughened by a blast of air that blows abrasive particles, such as aluminum oxide or steel grains, against the oxide film 10 in order to form a roughened surface 11 which has valleys extending into the cooking surface of the metal cookware 9. The roughened surface 11 has an average roughness (Ra) of 6–8 μm, and the distance between peaks and valleys is about 25–60 μm. Such a roughened surface 11 can facilitate the attachment and bonding of a succeeding coating thereon.

The roughened surface 11 is cleaned with pressurized air which is blown thereagainst and is further coated with an anti-stick film of fluorocarbon resin. Referring to FIG. 7, suspended fluorocarbon resin is sprayed onto the roughened surface 11 by 0.5–3.5 kg/cm$^2$ of pressurized air to form a primer coating 12. Fluorocarbon resin of the primer coating 12 embeds into the valleys and bonds tightly with the oxide film 10 and the cooking surface of the metal cookware 9. Afterwards, the metal cookware 9 is dried in a drying oven at about 50°–120° C. for about 5 minutes such that the primer coating 12 has a thickness of about 6–15 μm and a high hardness. The suspended fluorocarbon resin is further sprayed onto the primer coating 12 to form a top coating 13. The metal cookware 9 is dried in a drying oven at a temperature of about 150° C. for about 10 minutes and is further heated at a temperature of about 350°–420° C. for about 5 minutes such that the sintering process for the fluorocarbon resin is carried out. The top coating 13 has a thickness of about 15–25 μm. The hot metal cookware 9 is then removed from the drying oven and is cooled forcibly with a strong fan in atmospheric conditions.

The advantages of the present invention are described as follows:

1. Since the roughness surface 11 formed on the scratch-resistant oxide film 10 has valleys extending into the cooking surface of the metal cookware 9, the fluorocarbon resin of the anti-stick film sprayed on the oxide film 10 embeds into the cooking surface. The fluorocarbon resin bonds both the oxide film 10 and the cooking surface such that the anti-stick film can attach tightly to the metal cookware.

2. Owing to the sintering process for the fluorocarbon resin and owing to the provision of the oxide film, the resultant anti-stick film of fluorocarbon resin can have a good anti-stick characteristic and high hardness.

3. Aside from the major component of fluorocarbon resin, the anti-stick film can further contain metal powders, such as titanium powder, or non-metallic powders, such as ceramic powder, which can combine with fluorocarbon resin by the use of a solvent and a surfactant. In this way, the resultant anti-stick film can have a hardness of 4–8H that is larger than a hardness of 2H of a conventional metal cookware.

4. A cooking surface of a metal cookware which is treated by the method of this invention can have high hardness and a good anti-stick characteristic and can also have a relatively long service life when compared with a conventional metal cookware since the anti-stick film can attach firmly to the metal cookware. In using the metal cookware treated by the method of this invention, a metal frying utensil can be used and the cleaning of the metal cookware can be carried out completely and conveniently.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A method of coating an article of metal cookware having a cooking surface, comprising the steps of:
   (A) cleaning said article of metal cookware;
   (B) forming a scratch-resistant oxide film on said cooking surface by anodic oxidation;
   (C) roughening said scratch-resistant oxide film by blasting to form a roughened surface thereon, said roughened surface having valleys extending into said cooking surface; and
   (D) applying an anti-stick film of fluorocarbon resin on said roughened surface.

2. The method of coating an article of metal cookware as claimed in claim 1; wherein said article of metal cookware is made of a material selected from the group consisting of aluminum and aluminum alloys, and wherein the anodic oxidation in step (B) comprises applying an electrolytic solution which comprises a mixture of sulfuric acid, magnesium sulfate and ferrous sulfate.

3. The method of coating an article of metal cookware as claimed in claim 2, wherein said scratch-resistant oxide film contains aluminum oxide, magnesium oxide and iron oxide.

4. The method of coating an article of metal cookware as claimed in claim 3, wherein said scratch-resistant oxide film is about 40–80 micrometers thick.

5. The method of coating an article of metal cookware as claimed in claim 1, wherein step (A) comprises immersing said metal cookware in a basic solution and then in water.

6. The method of coating an article of metal cookware as claimed in claim 5, wherein said basic solution is a sodium hydroxide solution.

7. The method of coating an article of metal cookware as claimed in claim 1, wherein said roughened surface formed in step (C) has a roughness of about 6–8 micrometers, and wherein the depth of valleys is about 25–60 micrometers.

* * * * *